United States Patent
Spano et al.

(10) Patent No.: US 6,527,503 B2
(45) Date of Patent: Mar. 4, 2003

(54) METHOD OF POSITIONING TURBINE STAGE ARRAYS, PARTICULARLY FOR AIRCRAFT ENGINES

(75) Inventors: Ennio Spano, Turin (IT); Carmine Schips, Turin (IT)

(73) Assignee: Fiatavio S.p.A., Turin (IT)

( * ) Notice: Subject to any disclaimer, the term of this patent is extended or adjusted under 35 U.S.C. 154(b) by 0 days.

(21) Appl. No.: 09/908,762

(22) Filed: Jul. 19, 2001

(65) Prior Publication Data

US 2002/0048510 A1 Apr. 25, 2002

(30) Foreign Application Priority Data

Oct. 23, 2000 (IT) .......................... TO00A1001

(51) Int. Cl.[7] .............................................. F01D 00/00
(52) U.S. Cl. .......................................... 415/1; 415/193
(58) Field of Search .......................... 415/1, 193, 194, 415/195, 209.1, 199.5, 211.2, 191; 416/223 A, DIG. 2

(56) References Cited

U.S. PATENT DOCUMENTS 4,968,216 A * 11/1990 Anderson et al. ........ 415/199.5
5,486,091 A * 1/1996 Sharma ....................... 415/194
6,174,129 B1 * 1/2001 Mazzola et al. ............ 415/127
6,402,458 B1 * 6/2002 Turner ............................ 415/1

FOREIGN PATENT DOCUMENTS

EP          1 182 339 A2    2/2002
WO          WO 95/29331     11/1995

* cited by examiner

Primary Examiner—Edward K. Look
Assistant Examiner—James M McAleenan
(74) Attorney, Agent, or Firm—Carter J White; Howrey Simon Arnold & White

(57) ABSTRACT

A method of positioning arrays of stages of a turbine, particularly for aircraft engines; the turbine having an axis and a first, a second and a third array of blades arranged consecutively, and of which the first and third array have a relative velocity about the axis with respect to the second array; the method including the steps of determining the paths of wakes moving inside gaps defined by the blades in the second array and towards the third array; distinguishing, for each wake, a first and at least one second zone differing from each other; selecting one of the first and second zone; and regulating the position of the third array with respect to the first array by aligning the leading edges of the blades in the third array with the paths of the selected wake zones.

8 Claims, 2 Drawing Sheets

METHOD OF POSITIONING TURBINE STAGE ARRAYS, PARTICULARLY FOR AIRCRAFT ENGINES

This application claims priority under 35 USC §119 of application number TO2000A001001, filed Oct. 23, 2000 in Italy.

The present invention relates to a method of positioning turbine stage arrays, particularly for aircraft engines.

BACKGROUND OF THE INVENTION

As is known, an aircraft engine comprises a multistage compressor; a combustor; and an axial multistage expansion turbine, each stage of which comprises a stator fixed angularly about an axis of the engine, and a rotor rotating about the axis.

As known from European Patent EP0756667, to maximize the aerodynamic efficiency of the turbine, the stators all have the same number of blades and, considering a first and a second stator forming part of two consecutive stages in the axial flow direction of the gas in the engine, the angular position of the second stator about the engine axis is set with respect to that of the first stator as a function of the paths of the wakes generated by the first stator and flowing into the rotor interposed between the first and second stator.

More specifically, the second stator is positioned to roughly align the leading edges of the second-stator blades with the wakes from the rotor.

The above known positioning method is not always satisfactory and at times may either have no effect at all or even the opposite effect, i.e. tests show a reduction as opposed to an increase in the aerodynamic efficiency of the turbine as compared with that obtainable with the stator set to any angular position.

SUMMARY OF THE INVENTION

It is an object of the present invention to provide a method of positioning turbine stage arrays, particularly for aircraft engines, designed to provide a straightforward systematic solution to the above problem.

According to the present invention, there is provided a method of positioning arrays of stages of a turbine, particularly for aircraft engines, the turbine having an axis and comprising a first, a second and a third array arranged consecutively and comprising a number of first, second and third blades respectively; said first and said third array having a relative velocity about said axis with respect to said second array; the method comprising the step of determining the paths of wakes moving inside gaps defined by said number of second blades and towards said third array, and the step of regulating the position of said third array with respect to said first array as a function of said wakes; and being characterized by also comprising the steps of distinguishing, for each said wake, a first and at least one second zone differing from each other, and of selecting one of said first and said second zone; the position of said third array being regulated by aligning the leading edges of said number of third blades with the paths of the selected wake zones.

BRIEF DESCRIPTION OF THE DRAWINGS

The invention will now be described with reference to the accompanying drawings, in which.

DETAILED DESCRIPTION OF THE INVENTION

Figure 1:
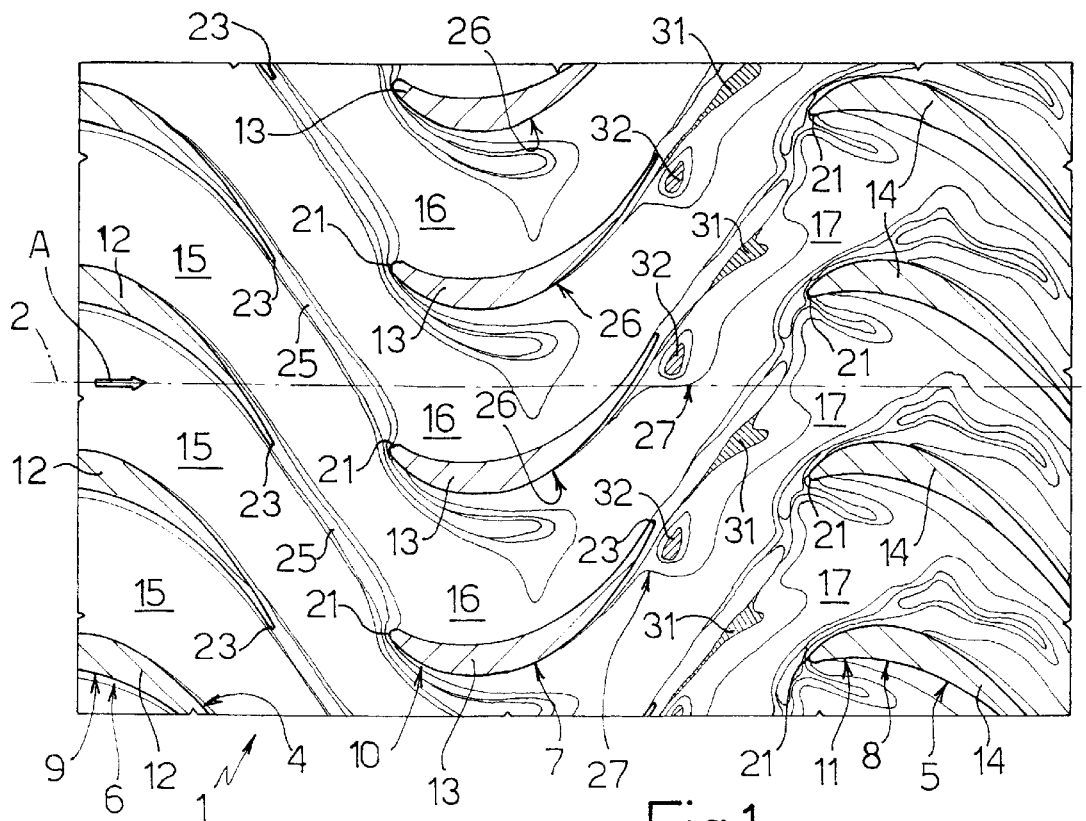
FIGS. 1 to 4 show, by way of example, a sequence of four consecutive instants in the operation of a turbine illustrated in the form of plan views of a circumferential section and regulated according to a preferred non-limiting embodiment of the method according to the present invention.
Figure 2:
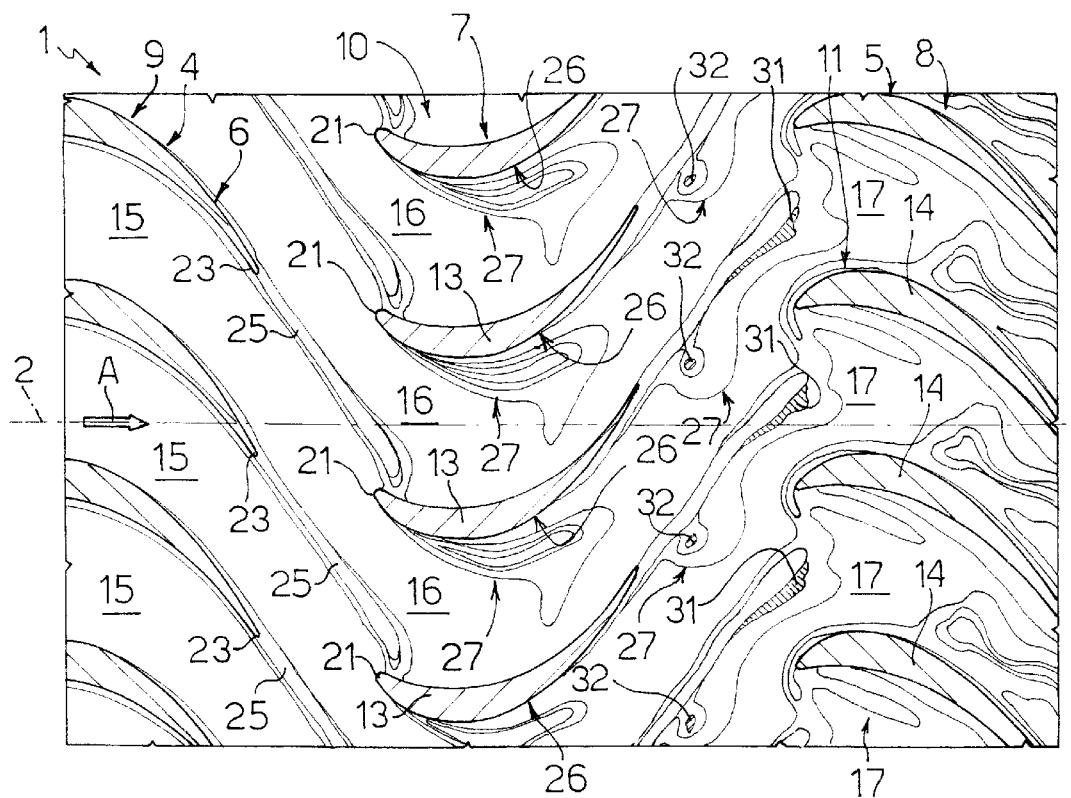
Figure 3:
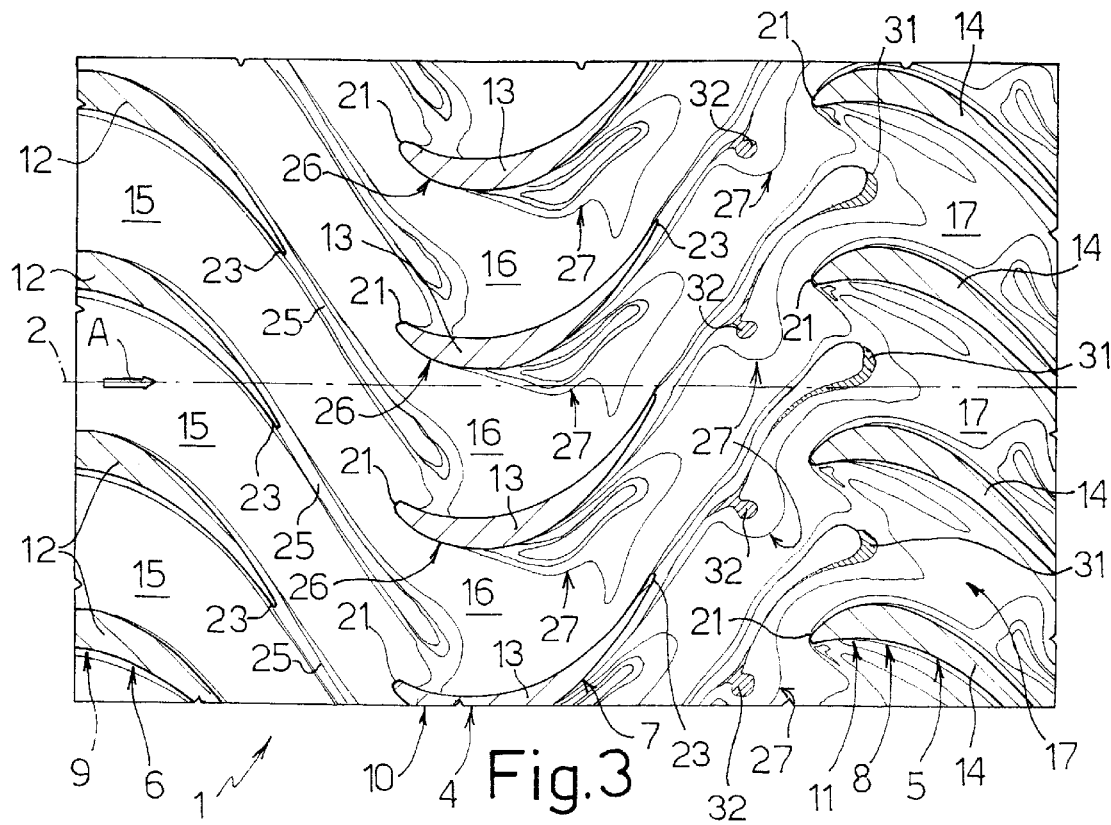
Figure 4:
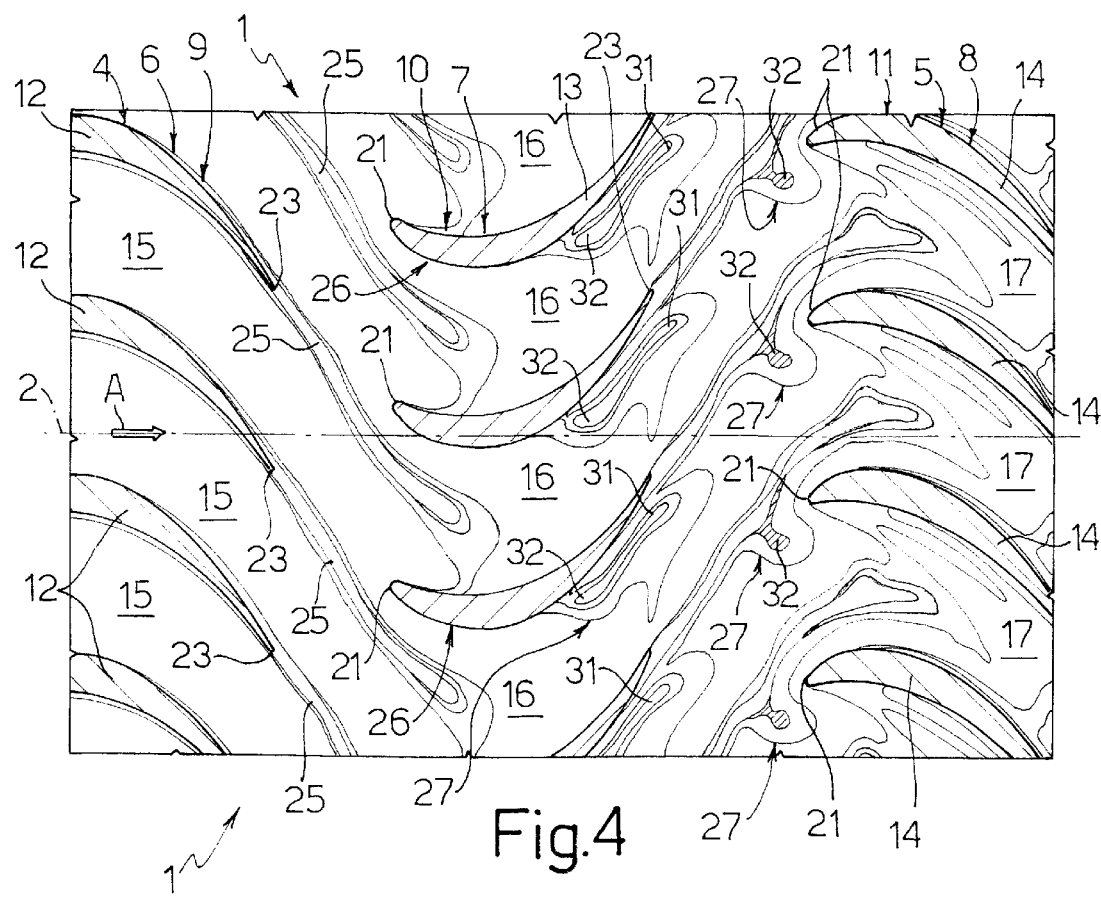

Number 1 in the accompanying drawings indicates as a whole a gas expansion turbine having an axis 2 and forming part, in particular, of an aircraft engine comprising a multistage compressor (not shown) and a combustor (not shown), both located upstream from turbine 1 and successively in the axial gas flow direction (indicated by arrow A) through the engine. Turbine 1 comprises a number of stages, two of which are shown partly and indicated 4 and 5 in the accompanying drawings.

The accompanying drawings show plan views of a section of turbine 1 along a cylindrical surface at a given radial distance from axis 2, and show three successive arrays 9, 10, 11 of respective blades 12, 13, 14 forming part of a stator 6, a rotor 7 and a stator 8 (shown partly) respectively. Stator 6 and rotor 7 form part of stage 4; stator 8 forms part of stage 5; and arrays 9, 11 have the same number of blades.

Blades 12, 13, 14 define respective numbers of interblade gaps 15, 16, 17 through which flows the stream of expanding gas flowing axially through turbine 1 in the direction of arrow A. As is known, each blade 12, 13, 14 has a wing profile and comprises a front or leading edge 21 and a tapered rear or trailing edge 23.

Gas flow in turbomachinery is nonstationary and affected strongly by the interaction of pressure waves, shock waves and stator and rotor wakes. The accompanying drawings relate to four respective consecutive instants, and show, by isentropic lines, the wake patterns and paths in the gas flow in gaps 15, 16, 17. Here and hereinafter, the term "wake" is intended to mean any flow portion characterized by a high level of entropy with respect to the mean level in the flow, and which is generated by the trailing edge 23 of any blade of turbine 1.

The trailing edge 23 of each blade 12 generates a respective wake 25. When the leading edges 21 of blades 13 encounter and "cut" wakes 25 as rotor 7 rotates, each wake 25 interacts with the boundary layer on the back, i.e. suction face, 26 of each blade 13, and progresses in the form of a wake 27. As array 10 rotates, each wake 27 travels along back 26 and flows off trailing edge 23 of relative blade 13 towards array 11 while, at the same time, each blade 13 encounters and "cuts" the next wake 25.

As it proceeds along gap 16, each wake 27 interacts with the flow field of rotor 7 and is broken up into a number of successive zones which are particularly evident at the outlet of gap 16 and have different thermodynamic and fluid-dynamic properties.

In the example shown, each wake 27 comprises two zones 31 and 32 spaced apart and of which zone 31 is the first to interact with array 11 and has a lower entropy value than zone 32.

Turbine 1 is regulated by positioning array 11 angularly about axis 2 and with respect to the position of array 9 as a function of wakes 27, to obtain a relatively high degree of aerodynamic efficiency of turbine 1.

The method of regulating or indexing turbine 1 comprises determining the path of wakes 27, and distinguishing, in each wake 27, zones 31, 32 having different thermodynamic and fluid-dynamic properties. Once zones 31, 32 are identified, their paths are determined, one of zones 31, 32 is selected, and the angular position of array 11 ("indexed array") is regulated to align each leading edge 21 in array 11 with the path of the selected wake zone, and to allow the nonselected wake zone to flow into relative gap 17.

The different zones 31, 32 in wake 27, the paths of wakes 25, 27 and zones 31, 32, the properties of the various points in wakes 27 and the efficiency of turbine 1 are all determined theoretically using a mathematical model describing and simulating the gas flows and the motion of turbine 1.

The mathematical model is formed by selecting a mathematical algorithm as a function of the type of turbine 1 and, in particular, of the type of flow occurring at the boundary layer of blades of turbine 1. Known mathematical algorithms can be classified into two groups, depending on whether the algorithm describes boundary layer flow in a completely turbulent flow condition typical of so-called "high-pressure" turbines, or in a laminar-turbulent flow transition condition typical of so-called "low-pressure" turbines. By way of example, of the algorithms in the first group describing the boundary layer, one of the known algorithms listed in the following bibliographical references, and preferably the so-called "mixing length" method, may be selected:

1) Arnone A., Liou M.-S. and Povinelli L. A., 1991, "Multigrid Calculation of Three-Dimensional Viscous Cascade Flows", AIAA 9th Applied Aerodynamics Conference, Baltimore, Md., September, 1991, AIAA-91-3238, NASA TM-105257, ICOMP-91-18, Journal of Propulsion and Power, Vol. 9, No. 4, July–August 1993, p. 605–614.
2) Arnone A., Liou M.-S. and Povinelli L. A., 1992, "Navier-Stokes Solution of Transonic Cascade Flow Using Nonperiodic C-Type Grids", Journal of Propulsion and Power, Vol. 8, No. 2, March–April 1992, p. 410–417.
3) Arnone A., Liou M.-S. and Povinelli L. A., 1995, "Integration of Navier-Stokes Equations Using Dual Time Stepping and a Multigrid Method", AIAA Journal, June 1995, Vol. 33, No. 6, p. 985–990.
4) Arnone A., Pacciani R. and Sestini A., 1995, "Multigrid Computations of Unsteady Rotor-Stator Interaction Using the Navier-Stokes Equations", ASME Winter Annual Meeting, Unsteady Flows in Aeropropulsion, AD-Vol. 40, p. 87–96, ASME Journal of Fluids Engineering, December 1995, Vol. 117, p. 647–652.

Again by way of example, of the algorithms in the second group, the one derived from the studies of Abu-Ghannam Shaw and Mayle and described in the following bibliographic reference may preferably be selected:

5) Arnone A., Marconcini M., Pacciani R. and Spano E., 1999, "Numerical Prediction of Wake Induced Transition in a Low Pressure Turbine", AIAA paper 99-IS-058, XIV ISABE Symposium, Sep. 5–10, 1999, Florence, Italy.

Once the mathematical algorithm is selected as a function of the type of flow in the boundary layer of turbine 1, the mathematical model is calibrated as a function of the boundary conditions, i.e. by entering the parameters. defining, on the one hand, the geometric characteristics of the turbine 1 for indexing, and, on the other, the thermodynamic characteristics and turbulence conditions of the gases upstream from turbine 1.

The resulting mathematical model is then analyzed using a computation method or code, in particular a version of a so-called "TRAF3D" code capable of solving Reynolds-averaged Navier-Stokes equations, using computation acceleration techniques to solve stationary and nonstationary quasi-three-dimensional and three-dimensional flow fields.

The above computation method is described in the above bibliographic references.

Once the mathematical model is analyzed and computed, the wake zone with which to align each leading edge 21 of array 11 is selected as a function of the thermodynamic and fluid-dynamic properties of zones 31, 32, and preferably by comparing the entropy values determined theoretically in zones 31, 32 and at various points in wakes 27 in general.

With reference to the accompanying drawings, array 11 is positioned to align the leading edges 21 of blades 14 with the paths of the higher-entropy wake zones, i.e. zones 32, so that zones 32 strike leading edges 21 of blades 14 and zones 31 flow into gaps 17.

Alternatively, the wake zone by which to index array 11 is selected by determining, preferably theoretically, which zone 31, 32 gives the higher efficiency. Array 11 is positioned by aligning leading edges 21 first with one and then with the other of zones 31, 32; the efficiency of turbine 1 is determined for each position; and the higher-efficiency wake zone and position are selected.

More generally speaking, array 11 may be set to a number of trial-and-error angular positions, and the highest-efficiency position selected. The same also applies to fine-positioning array 11.

By indexing array 11 with respect to the paths of zones 32, the aerodynamic efficiency of turbine 1 has been found, both experimentally and theoretically, to assume the highest value obtainable by setting stator 8 to a number of generic positions about axis 2 and with respect to stator 6.

In the event (not shown) turbine 1 is set to align leading edges 21 of blades 14 with the paths of zones 31, the aerodynamic efficiency of turbine 1 has been found, both experimentally and theoretically, to assume the lowest possible value, despite array 11 being indexed on the basis of generic wakes 27.

Testing provides for confirming the theoretical findings and, in particular, the fact that the mathematical model used represents the actual operating conditions.

The positioning method described therefore provides for accurately adjusting the relative position of stages 4, 5 of turbine 1 by accurately defining, unlike known methods, the angular position of array 11 with respect to array 9 best suited to achieve the highest efficiency of turbine 1.

The reason for this lies in necessarily distinguishing the various contributions or zones into which each wake 27 is broken prior to interacting with the indexed array 11, and selecting the right wake zone with which to align the leading edges 21 of array 11.

In fact, approximate positioning of array 11, e.g. with respect to the path of a mean point in wake 27, may even have the opposite effect and result in a relatively low level of efficiency.

Given the possibility of theoretically determining the paths and all the parameters or quantities involved, such as flow field entropy and turbine 1 efficiency, and the possibility of simulating overall operation of the turbine, the position of array 11 may even be assigned at the turbine 1 design stage.

Clearly, changes may be made to the array positioning method as described herein without, however, departing from the scope of the-present invention.

In general, the positioning or indexing method described applies to any homonymous pair of successive blade arrays having a relative velocity with respect to an intermediate array. That is, the method can also be applied in the same way to determining, as a function of the wake paths of an intermediate stator, the relative angular position of two rotors forming part of two successive stages and having the same number of blades, or one a number of blades which is a multiple of the other.

Moreover, since gas flow varies as a function of the radial position examined in gaps 15, 16, 17 with respect to axis 2, the indexing method described can be applied to a number of arrays set to different radial positions in a stator or rotor.

Depending on gas flow conditions and the type of turbine involved, each wake 27 may be broken into more than two different zones, or may comprise only one zone of relatively high entropy, which is determined accurately using the method described.

As opposed to having the same number of blades, one of arrays 9, 11 may have a number of blades which is a multiple of the other.

Finally, the wake zone with which to align the leading edges 21 of blades 14 may be selected as a function of parameters or quantities other than those indicated.

What is claimed is:

1. A method of positioning arrays of stages (4, 5) of a turbine (1), particularly for aircraft engines, the turbine (1) having an axis (2) and comprising a first (9), a second (10) and a third (11) array arranged consecutively and comprising a number of first (12), second (13) and third (14) blades respectively; said first and said third array (9)(11) having a relative velocity about said axis (2) with respect to said second array (10); the method comprising the step of determining the paths of wakes (27) moving inside gaps (16) defined by said number of second blades (13) and towards said third array (11), and the step of regulating the position of said third array (11) with respect to said first array (9) as a function of said wakes (27); and being characterized by also comprising the steps of distinguishing, for each said wake (27), a first (31) and at least one second (32) zone differing from each other, and of selecting one (32) of said first and said second zone (31)(32); the position of said third array (11) being regulated by aligning the leading edges (21) of said number of third blades (14) with the paths of the selected wake zones (32).

2. A method as claimed in claim 1, characterized by allowing the nonselected wake zones (31) to enter the gaps (17) defined by said number of third blades (14).

3. A method as claimed in claim 1, characterized in that said first and said second zone (31)(32) are distinguished by selecting, as a function of the type of said turbine (1), one of a number of mathematical algorithms simulating flow in the turbine (1).

4. A method as claimed in claim 3, characterized by comprising the step of calibrating the selected said algorithm as a function of boundary conditions.

5. A method as claimed in claim 1, characterized in that said first and said second zone (31)(32) are assigned at least one parameter having different values for the first and second zone (31)(32); and in that one (32) of said first and said second zone (31)(32) is selected by determining the value of said parameter for each said first and second zone (31)(32) and by comparing the resulting said values.

6. A method as claimed in claim 5, characterized in that said parameter is defined by the entropy determined in said first and said second zone (31)(32).

7. A method as claimed in claim 5, characterized in that said parameter is defined by the fluid-dynamic efficiency of said turbine (1).

8. A method as claimed in claim 5, characterized in that one (32) of said first and said second zone (31)(32) is selected theoretically by numerical calculation.

* * * * *